Aug. 1, 1939.  O. HUMMEL  2,167,805
APPARATUS FOR MIXING DIFFERENT OR SIMILAR SUBSTANCES
Filed March 8, 1937
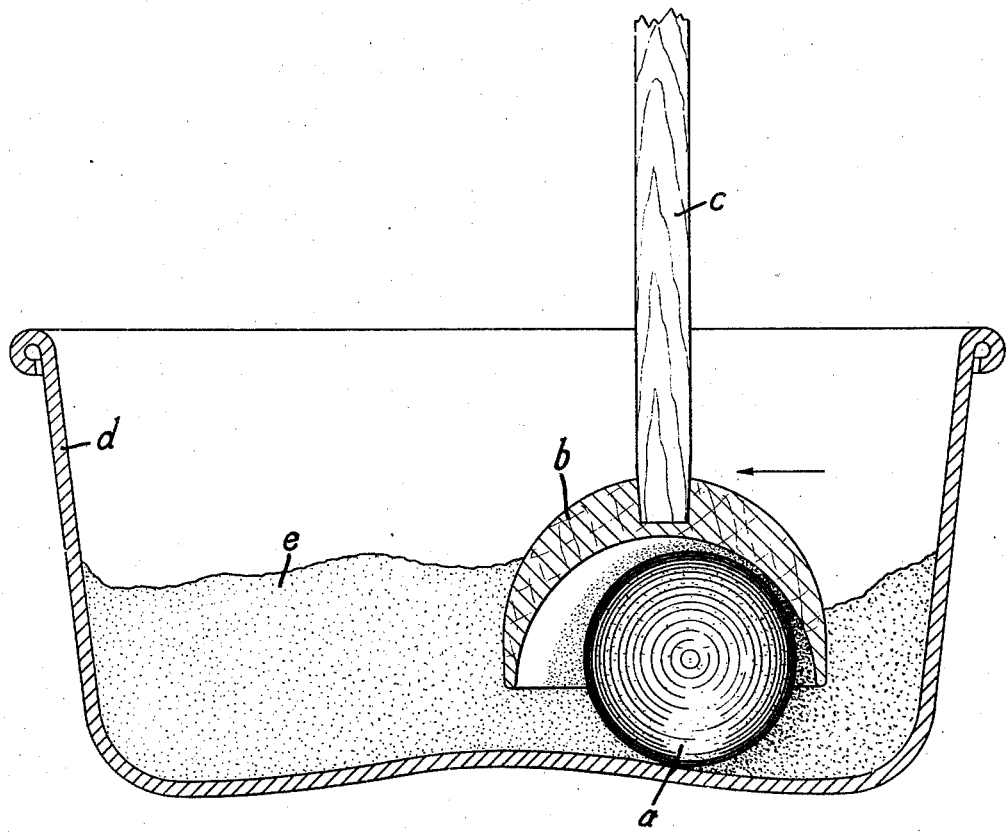
Inventor:
Oscar Hummel
By Young, Emery & Thompson
Attorneys Patented Aug. 1, 1939

2,167,805

UNITED STATES PATENT OFFICE 2,167,805

APPARATUS FOR MIXING DIFFERENT OR SIMILAR SUBSTANCES

Oscar Hummel, Stuttgart-Rohr, Germany

Application March 8, 1937, Serial No. 129,670
In Germany October 26, 1936

1 Claim. (Cl. 259—99)

This invention relates to an apparatus for mixing different or similar substances. It was hitherto customary to mix certain substances in a common vessel by means of a stirring member. It is also known, to employ a horizontally rotating hollow spherical vessel on the side walls of which the substances to be mixed climb up and, after having reached a certain height, fall back under the action of gravity. It is also known, to rotate the mixing vessel about a stationary or counter-rotating stirring member instead of employing a rotary or reciprocating stirring member in the vessel.

The object of the invention is, to bring into particularly intimate connection different or similar, preferably powdered or liquid substances, by means of less power and in a shorter time than was hitherto possible. This is attained according to the invention by freely moving a preferably spherical mixing body between the inner wall of a mixing vessel and the inner vault of a cup-shaped cage.

The apparatus according to the invention comprises two parts, namely a mixing member, preferably of spherical shape, and a cup-shaped cage which is connected with a source of power by suitable means. The spherical mixing member is accommodated in the cup-shaped cage, the internal diameter of which is larger than the diameter of the spherical mixing member, about half the spherical mixing member projecting from the cavity of the cup-shaped cage. The cage is moved by a source of power through the intermediary of an actuating or driving member.

An embodiment of the invention is illustrated diagrammatically partly in elevation and partly in section in the only figure of the accompanying drawing.

The spherical mixing member $a$ is inserted into the substances to be mixed contained in a mixing vessel, and then covered by an inverted cup-shaped cage $b$. The cage $b$ is moved to and fro or rotated by a source of power not shown in the drawing through the intermediary of the actuating or driving member or stem $c$, so that the spherical mixing member $a$ carries out a to and fro or circulating movement between the inner wall of the mixing vessel and the inner surface of the cup-shaped cage $b$. The mixing process is improved if the mixing vessel is moved at the same time in a different direction to that of cage $b$.

The rolling mixing member $a$ may be of roll-shape and the cage $b$ of corresponding trough-shape, but the mixing process is particularly good when a spherical mixing member $a$ is employed.

The apparatus according to the invention can be employed for mixing all kinds of substances. In the case of coarse-grained substances the parts of the apparatus must be in proportion to the size of the grains of the substances. For domestic use, for example for mixing edible substances to form a paste, the spherical mixing member $a$ and the cage $b$ may be made of wood. Where it is necessary, for example when employing the mixing apparatus in mechanical arrangements, the parts may be made of metal, porcelain or any other suitable material.

As shown on the drawing the mixing device may be used by moving the cup-shaped cage $b$ in the direction indicated by the arrow in the mixing vessel $d$ so that the material $e$ in the mixing vessel will be thoroughly mixed.

I claim—

An apparatus for mixing substances, comprising in combination with a mixing vessel containing the substances to be mixed, a spherical mixing member adapted to be placed in the substance to be mixed, a cup-shaped cage adapted to be inverted over said mixing member and covering approximately one half the spherical mixing member when in contact therewith, and which contact surface of the cage has a radius of spherical curvature slightly larger than the spherical surface of the mixing member, a stem secured to the cage for imparting a movement to said cage, said cage having a peripheral edge extending in a direction which is approximately parallel to the longitudinal axis of the stem.

OSCAR HUMMEL.